(12) United States Patent
Tuck et al.

(10) Patent No.: US 9,247,409 B2
(45) Date of Patent: Jan. 26, 2016

(54) HOME AUTOMATION COMMUNICATIONS

(71) Applicant: EchoStar Technologies L.L.C., Englewood, CO (US)

(72) Inventors: Frederick Tuck, Dunwoody, GA (US); Mark Wayne Lea, Kennesaw, GA (US); George Horkan Smith, Atlanta, GA (US); David B. Lett, Duluth, GA (US)

(73) Assignee: EchoStar Technologies L.L.C., Englewood, CA (US)

( * ) Notice: Subject to any disclaimer, the term of this patent is extended or adjusted under 35 U.S.C. 154(b) by 171 days.

(21) Appl. No.: 14/100,543

(22) Filed: Dec. 9, 2013

(65) Prior Publication Data

US 2015/0163651 A1  Jun. 11, 2015

(51) Int. Cl.
*H04W 4/22* (2009.01)
*H04L 12/28* (2006.01)
*H04M 7/00* (2006.01)
*H04M 11/04* (2006.01)

(52) U.S. Cl.
CPC ............. *H04W 4/22* (2013.01); *H04L 12/2803* (2013.01); *H04M 7/006* (2013.01); *H04M 11/04* (2013.01); *H04M 2242/04* (2013.01)

(58) Field of Classification Search
CPC .... H04W 4/22; H04L 12/2803; H04M 7/006; H04M 11/04
See application file for complete search history.

(56) References Cited

U.S. PATENT DOCUMENTS

| | | | | |
|---|---|---|---|---|
| 6,661,340 | B1* | 12/2003 | Saylor et al. | 340/517 |
| 7,406,710 | B1* | 7/2008 | Zellner et al. | 726/14 |
| 2007/0155412 | A1* | 7/2007 | Kaltsukis | 455/466 |
| 2008/0118039 | A1* | 5/2008 | Elliot et al. | 379/45 |
| 2014/0028783 | A1* | 1/2014 | Kaltsukis | 348/14.08 |
| 2014/0266699 | A1* | 9/2014 | Poder et al. | 340/539.13 |

OTHER PUBLICATIONS

Enhanced 9-1-1—Wikipedia; http://en.wikipedia.org/wiki/Enhanced_9-1-1, 5 pages, Nov. 23, 2013.
Intrado, Public Safety—NextGen 9-1-1, http://www.intrado.com/solutions/PSAP, 2 pages, Nov. 23, 2013.

* cited by examiner

*Primary Examiner* — Paul H Masur
(74) *Attorney, Agent, or Firm* — Bejin Bieneman PLC

(57) ABSTRACT

A system mobile computing device is at a first geographic location different from a second geographic location of a customer premises. The mobile computing device is configured to receive from the customer premises information including data indicating a status of the customer premises and an identifier for the customer premises. The device is further configured to receive user input to place an emergency call concerning the customer premises, to provide the identifier for the customer premises to a data store as part of a query for a location of the customer premises; to receive a response to the query including the second location, and send a request for a public safety answering point (PSAP) to request emergency services at the second location.

17 Claims, 4 Drawing Sheets

HOME AUTOMATION COMMUNICATIONS

BACKGROUND

So-called home automation systems generally include sensors, cameras, and the like that provide data to a computing device such as a central controller. The central controller may then provide information relating to events, the environment, and so forth, in a building such as a home. For example, a home automation system may detect temperature conditions, moisture conditions, smoke and/or fire conditions, possible break-ins, etc.

In some instances a home automation system may be configured to automatically request emergency services upon detecting certain conditions, e.g., to call "911" emergency services or the like upon detecting a fire, possible break-in, etc. In other instances, some or all conditions reported by a home automation system may require a user decision and action to request emergency services.

When a user is present in a building, apartment, suite, etc. that includes a home automation system, the user can act on information from the home automation system as appropriate to seek emergency services, e.g., by dialing an emergency service, e.g., a "911" service. However, at present emergency services are geographically-dependent, and mechanisms are lacking for a user to request emergency services related to information from a home automation system when a user is geographically remote from a location that includes the home automation system, possibly even in a different city, state, or country.

DETAILED DESCRIPTION

Introduction

Figure 1:
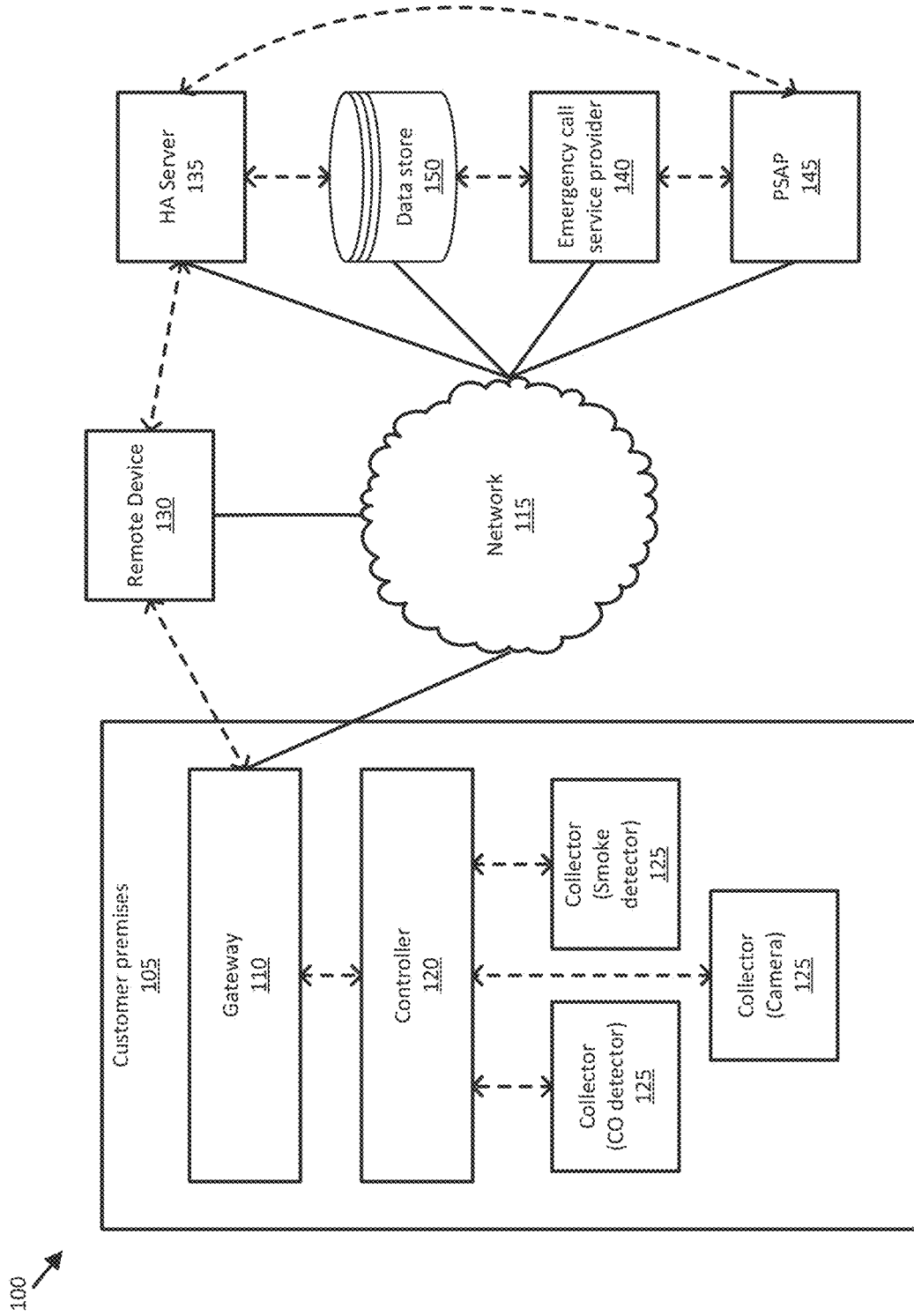
FIG. 1 is a block diagram of an exemplary home automation communications system.

FIG. 1 is a block diagram of an exemplary home automation communications system 100. As seen in FIG. 1, the system 100 generally includes a customer premises 105. Further, the system 100 could, and typically does, include many customer premises 105, although only a single customer premises 105 is shown in FIG. 1 for ease of illustration. The customer premises 105 may include a home automation gateway 110 for communicating via a network 115 with a remote device 130. The gateway 110 may be connected to a home automation controller 120 that receives and interprets data from one or more data collectors 125, e.g., as shown in FIG. 1, a carbon monoxide detector, a smoke detector, a video or still camera, etc. When data from one or more of the data collectors 125 indicates an emergency or alert condition in the customer premises 105, the controller 120 may provide a message via the gateway 110 to one or more remote devices 130.

A device 130 that is geographically remote from the customer premises 105 may be used to make a request for emergency services, e.g., a telephone call to an emergency call center or service provider, via a variety of mechanisms. Advantageously, even though the device 130 is geographically remote from the customer premises 105, the request for emergency services may include a location of the customer premises 105, i.e., specify that emergency services are requested at the location of the customer premises 105, and not the geographically remote location of the device 130. The remote device 130 generally includes a processor and a memory, and the memory may store instructions executable by the processor to place a call, e.g., using Voice over Internet Protocol (VoIP).

Certain known mechanisms for making emergency calls may be used in the context of the system 100. In general, as is known, an emergency "911" call may be made from a telephone in a customer premises 105 using the so-called plain old telephone service (POTS), which generally uses a public-switched telephone network (PSTN). For present purposes, the terms "POTS" and "PSTN" may be used interchangeably.

Known signaling mechanisms may be used by a PSAP or the like when an emergency call is made to provide a phone number from which a call is made, e.g., using Automatic Number Identification (ANI) in an advanced intelligent network (AIN) as is known. Further, as is known, a location, e.g., street address, of a POTS telephone from which an emergency call is made may be determined, e.g., the PSAP may use a number obtained via ANI to then identify a location from which a call originated using the known Master Street Address Guide (MSAG). Additionally, a request for emergency assistance generally includes an identification of a problem so that an appropriate emergency responder, e.g., Police Department, fire department, ambulance, etc., may be contacted and requested to provide assistance. Mechanisms for a controller 120 or the like to include information identifying a problem type, e.g., fire, possible break-in, etc., are known.

Furthermore, a so-called "Enhanced 911," or "E-911" service may be used to provide emergency calling for mobile, e.g., cellular, phones. An E-911 service accounts for a major difference between a mobile telephone and a POTS telephone, namely that a mobile telephone does not have a fixed location, and therefore a database such as the MSAG cannot be usefully consulted to obtain a mobile telephone location. Accordingly, an E-911 message includes, in addition to information for determining an originating telephone number, a location record. The location record in an E-911 may be in one of two formats, a street address according to a format of the MSAG, or a Global Information Service (GIS) location, i.e., geo-coordinates including a latitude and longitude. As is known, a mobile telephone location may be obtained via a variety of mechanisms, e.g., triangulation using relative signal strength from three or more cell towers, Global Positioning System (GPS) functionality in a smart phone, etc., which location information may be then mapped to a street location, e.g., by a PSAP.

Voice over Internet Protocol (VoIP) calls, like calls made by a mobile telephone using an E-911 service, must specify a location to a service provider, e.g., a PSAP, to which an emergency call is made. Accordingly, when a VoIP service is established in a customer premises 105, a VoIP telephone may be configured to provide a location when an emergency call, e.g., a 911 call, is placed.

Advantageously, as mentioned above, the system 100 includes a capability for a remote device 130 to initiate an emergency call specifying a location of a customer premises 105, rather than a location of the remote device 130. Accordingly, a remote device 130 may be configured to request emergency assistance for a customer premises 105 even when the remote device 130 is at a physical location outside the boundaries of the customer premises 105.

For example, the device 130 may be configured to use VoIP to make a call to a home automation server 135, geographically remote (i.e., at a different physical location) from each of the customer premises 105 and the device 130 via the network 115. The call may be made according to a known communications protocol, e.g., Session Initiation Protocol (SIP), or the like. Further, the device 130 may include, e.g., in a SIP INVITE message or the like, information identifying the customer premises 105.

In an exemplary implementation, the gateway 110 is configured to provide a media access control (MAC) address or some similar unique or substantially unique identifier or identifiers associated with the customer premises 105, e.g., an identifier of the gateway 110 and/or the controller 120. Upon receiving a message including the gateway 110 and/or other customer premises 105 identifier, the server 135 may submit a query to a home automation data store 150 to determine a public safety answering point (PSAP) 145 associated with the geographic location of the customer premises 105. The database 150 generally includes location information and/or an identifier for a PSAP associated with the gateway 110 identifier, along with information relating to the PSAP, such as its telephone number. Alternatively or additionally, the database 150 could include customer premises 105 location information, e.g., a street address or geo-coordinates, associated with a mobile telephone number. Upon receiving PSAP information from the data store 150, the server 135 may then place a telephone call to the PSAP 145 associated with the customer premises 105.

In a further alternative or additional exemplary implementation, the remote device 130, upon receiving a message, alert, etc., from a gateway 110, could be configured to return an instruction to a computing device, e.g., the controller 120, in the customer premises 105 via the gateway 110, to place a call to the PSAP 145 for the customer premises 105. For example, the customer premises 105 could include hardware and/or software, e.g., included in or attached to the controller 120, or separate hardware and/or software (not shown in FIG. 1) for making telephone calls via a VoIP or public switched telephone network (PSTN) service. Further, a computing device such as the controller 120 could be configured to cause an emergency call to be made via a VoIP and/or PSTN telephone service provided to the customer premises 105. A VoIP service, as is known, may be configured to provide identifying information to a PSAP 145 and/or to place calls via the PSTN, e.g., via a media gateway, such as is known. Likewise, a call made via a PSTN is generally routed to a central office, from which an emergency call, e.g., a 911 call, may be routed to an appropriate PSAP 145 for the customer premises 105.

Yet further alternatively or additionally, the remote device 130 may be configured to place a call to an existing emergency call service provider service 140. The service provider service 140 could be configured to receive identifying information for a customer premises 105 in the manner described above with respect to the server 135, to query the data store 150, and/or to place a call to the PSAP 145.

Yet further alternatively or additionally, the device 130 could be configured to place a call directly to the PSAP. For example, an application included in a memory, and executed by a processor, of the remote device 130, could be configured to receive messages from the gateway 110 relating to the customer premises 105, and could further be configured to call a particular PSAP 145 appropriate for the customer premises 105. That is, the device 130 could be configured to call a particular telephone number of a PSAP 145 servicing a geographic location including the customer premises 105.

Exemplary System Elements

The customer premises 105 generally includes a building, structure, or portion thereof, including home automation elements 110, 120, 125 discussed herein. For example, the customer premises 105 may be a house, condominium, apartment, or other home residence. Further, although the system 100 is described herein with respect to "home" automation systems, the system 100 could include, and/or systems and/or processes disclosed herein could be applicable to, commercial or other types of premises 105. Various mechanisms for communications within the customer premises 105 are discussed below, and moreover may include various networking technologies, such as a wired and/or wireless local area network (LAN), Bluetooth, ZigBee, Z-wave, etc.

The gateway 110 generally includes software and/or hardware such as is known for allowing one or more computing devices, e.g., the controller 120, to communicate via a network 115. In general, when communications to and from the controller 120 are described herein, it is to be understood that such communications generally occur via the gateway 110, which is communicatively coupled to the network 115.

In general, the network 115 represents one or more mechanisms for providing messages, telephone calls, and the like to and from the gateway 110. Accordingly, the network 115 may be one or more of various wired or wireless communication mechanisms, including any desired combination of wired (e.g., cable and fiber networks) and/or wireless (e.g., cellular network, satellite network, etc.) communication mechanisms, and any desired network topology (or topologies when multiple communication mechanisms are utilized). Exemplary communication networks include wireless communication networks, local area networks (LAN) and/or wide area networks (WAN), including the Internet, etc. The network 115 generally utilizes digital and/or packet networking technologies, but as mentioned above, the system 100 may make use of the PSTN or the like, and therefore the network 115 may further at least in part include such analog technologies, as well as media gateways or the like, known for allowing communications to travel between digital (e.g., packet) and analog (e.g., PSTN or POTS) networks.

Returning to the customer premises 105, the controller 120 is generally a computing device including a processor and a memory, and also includes mechanisms for communicating with, and receiving data from, one or more data collectors 125. For example, the controller 120 generally may communicate with the data collectors 125 via known mechanisms, e.g., according to IEEE 802.11, the ZigBee protocol, the Z-Wave protocol, the Bluetooth protocol, and/or a wired local area network (LAN), etc. The controller 120 may be one or more various computing devices, including a laptop computer, desktop computer, dedicated home automation computer, set-top box, etc.

Data collectors 125, as mentioned above, may include one or more sensors, cameras, etc. For example, in addition to the camera, carbon monoxide detector, and smoke detector, shown in FIG. 1, data collectors 125 may include motion sensors, noise sensors, temperature sensors, moisture sensors, etc. Further, a data collector 125 may be a control system or the like that is located in the customer premises 105 and configured to provide data to the controller 120, e.g., a home thermostat may communicate with the controller 120 to provide information relating to temperature settings, detected temperature, etc.

A remote device 130 may be any one of a variety of computing devices including a processor and a memory, as well as communication capabilities as disclosed herein. For example, the device 130 will often be a portable computing device such as is referred to as a "smartphone," but more generally may be a portable computer, tablet computer, a smartphone, etc., that includes capabilities for cellular and/or VoIP calls, communications using IEEE 802.11, Bluetooth, etc. The device 130 may use such communication capabilities to communicate via the network 115.

In one implementation, the device 130 is configured to provide alerts relating to medical emergencies, e.g., such devices are known for use by the elderly, chronically ill, etc. For example, a data collector 125 could be a medical alert device in which an alert could be indicated based on a medical alert data collector 125 wearer depressing an alert button or the like, or by a sensor included in the data collector 125 providing data values below or above a predetermined threshold, e.g., relating to respiration, pulse, blood pressure, etc. In the context of the system 100, a medical alert device 130 could be configured, on an alert being indicated, to send a message to the controller 120. Alternatively, a medical alert data collector 125 could be configured to communicate directly with the device 130, e.g., using simple message service (SMS), e-mail, VoIP or the like. Data provided by a medical alert data collector 125 to a remote device 130 could include the fact that an alert is indicated along with data such as a pulse rate, respiration rate, blood pressure, state of consciousness, etc., of a medical alert data collector 125 wearer or user. Further, a VoIP connection could be used to allow a user of a remote device 130 to speak with a wearer or user of a medical alert data collector 125, e.g., to ascertain whether an emergency number such as an E-911 number, should be called. In any event, on receiving data from a medical alert data collector 125, a remote device 130 could be used to initiate an E-911 call or the like as described herein.

The home automation remote server 135 may be one or more computing devices including a processor and a memory and configured for operations as disclosed herein. For example, the home automation server 135 may be configured to receive VoIP calls and/or messages from a remote device 130, such calls and/or messages from the device 130 including an identifier for a gateway 110 and/or customer premises 105. Moreover, the server 135 may be configured to query the data store 150 and to place calls to a PSAP 145 as described above.

The call service provider service 140 is a known entity for processing emergency calls such as 911 calls and E-911 calls. The service 140 as presently known may receive 911 calls or the like, and forward such emergency calls to an appropriate PSAP 145. Further, and in a novel aspect, the service 140 may be configured to receive gateway 110 or customer premises 105 identifying information in a call from a device 130 as described above, and further to query the data store 150 and then place a call to an appropriate PSAP 145 as described above.

The data store 150 may include one or more databases or the like such as are known, e.g., a relational databases. The data store 150, as explained above, generally includes information associating a customer premises 105, e.g., via a gateway 110 identifier or the like, with a PSAP 145. Further, the data store 150 generally stores a location, e.g., a street address and/or geo-coordinates, of a customer premises 105 in association with the unique or substantially unique identifier for the customer premises 105.

Exemplary Graphical User Interfaces

Figure 7:
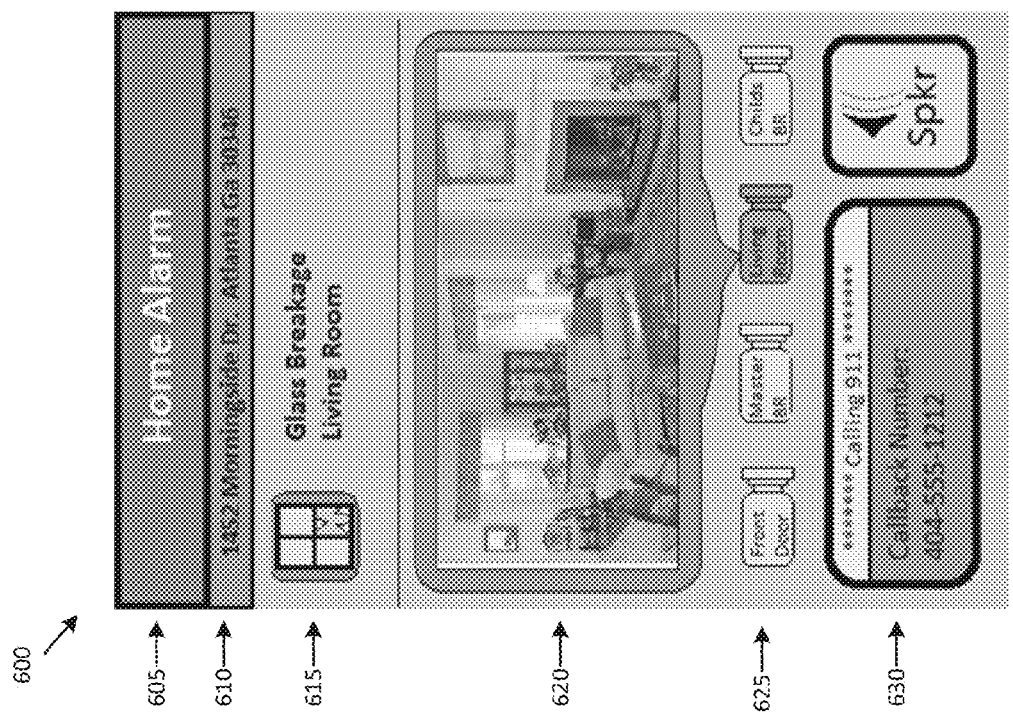
FIG. 7 illustrates a further exemplary graphical user interface for reporting a possible emergency incident via a remote device.
Figure 6:
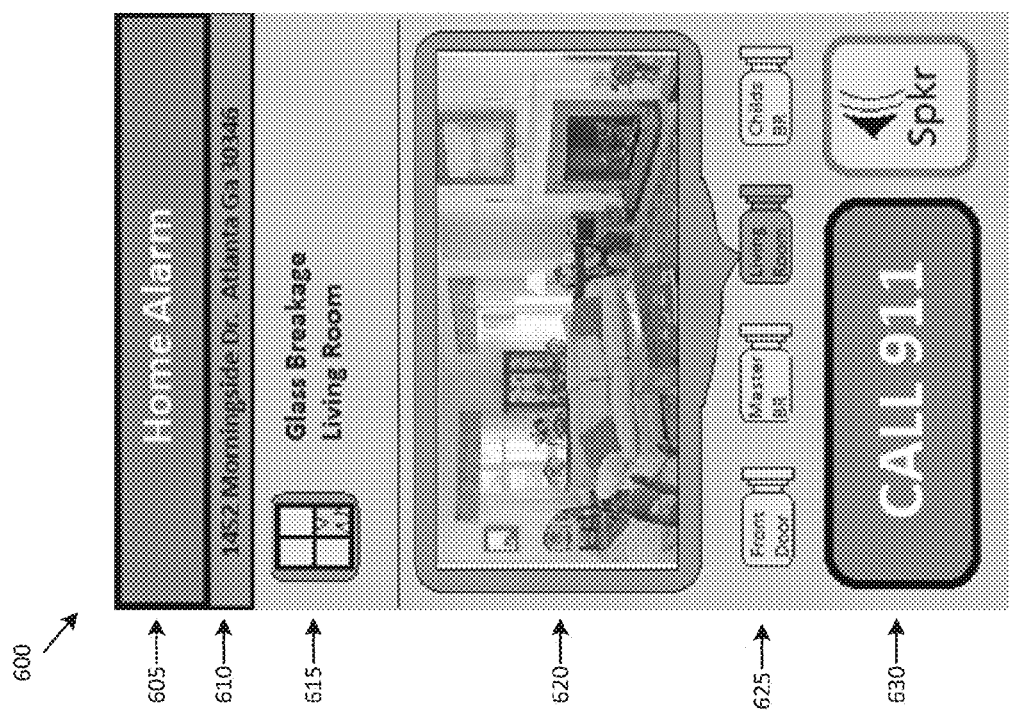
FIG. 6 illustrates an exemplary graphical user interface for reporting a possible emergency incident via a remote device.

FIGS. 6 and 7 illustrates an example of a graphical user interface (GUI) 600 in a remote device 130 for reporting a possible emergency incident. For example, as explained above, the controller 120 may receive data from a collector 125 indicating a possible emergency in a customer premises 105, e.g., sounds or images indicating a possible break-in, indications of carbon monoxide or smoke indicating a possible fire, etc. accordingly, the controller 120 could be configured to provide information to the remote device 130, e.g., via the gateway 110 and/or the network 115. Upon receiving information from the controller 120, the remote device 130 could be configured, e.g., could include instructions in the form of an "app" or the like, to display the GUI 600.

The GUI 600 may include various fields or elements, such as an alert field 605, generally used for providing the nature of an alert and/or potential emergency. In the example of the GUI 600, the alert relates to a "Home Alarm," and other examples could be "Smoke Alarm," "Water Damage," "HVAC Failure," etc. A location field 610 indicates a location of the customer premises 105 from which a controller 120 has sent information being displayed in the GUI 600. The location field 610 may be particularly important where a device 130 is configured to receive information from more than one customer premises 105.

A status description field 615 describes an incident and/or potential emergency, e.g., "Glass Breakage—Living Room." Other examples of described statuses could relate to fire, water damage, abnormal temperatures in a customer premises, an open door, etc.

A data display field 620 may be used to display media content and/or other data provided by the controller 120 from a collector 125, e.g., a still image, a video image, etc. Further, audio content from a data collector 125, although not displayed in a visual sense in the GUI 600, could be displayed by being played through a speaker, headphone, etc., in the remote device 130. The media display field 620 could include a message or indication, e.g., "audio being played from bedroom 1 microphone," that audio was being played along with a description of the audio. Further, audio could be played along with a display of moving or still images in the field 620.

Yet further alternatively or additionally, the display field 620 could display data from a collector 625, e.g., "smoke detected," "living room temperature 50 degrees Fahrenheit," etc. Such information transmitted by the controller 120 could be displayed alongside or over a display of media content, e.g., still or moving images, in the field 620.

Further, a display in the field 620 may be determined according to a user selection of one or more data collector selectors 625. For example, as seen in FIGS. 6 and 7, the selectors 625 allow a user to choose to display data such as media content from one of a plurality of available data collectors 125. In the example of the GUI 600, the available data collectors 625 are cameras at various locations in the customer premises 105.

An emergency call field 630 provides input and output related to an emergency call. For example, as seen in FIG. 6, a user may provide input to call an emergency number such as 911. As seen in FIG. 7, the field 630 may be used to display information about a status of an emergency call, e.g., that the call is in progress, a telephone number being provided with a request for emergency service in the emergency call (generally a number associated with the remote device 130) etc.

Although not shown in the Figures, the field 630 could further display other statuses of an emergency call, e.g., "a dispatched," "unable to locate address," etc.

Exemplary Process Flows

Figure 2:
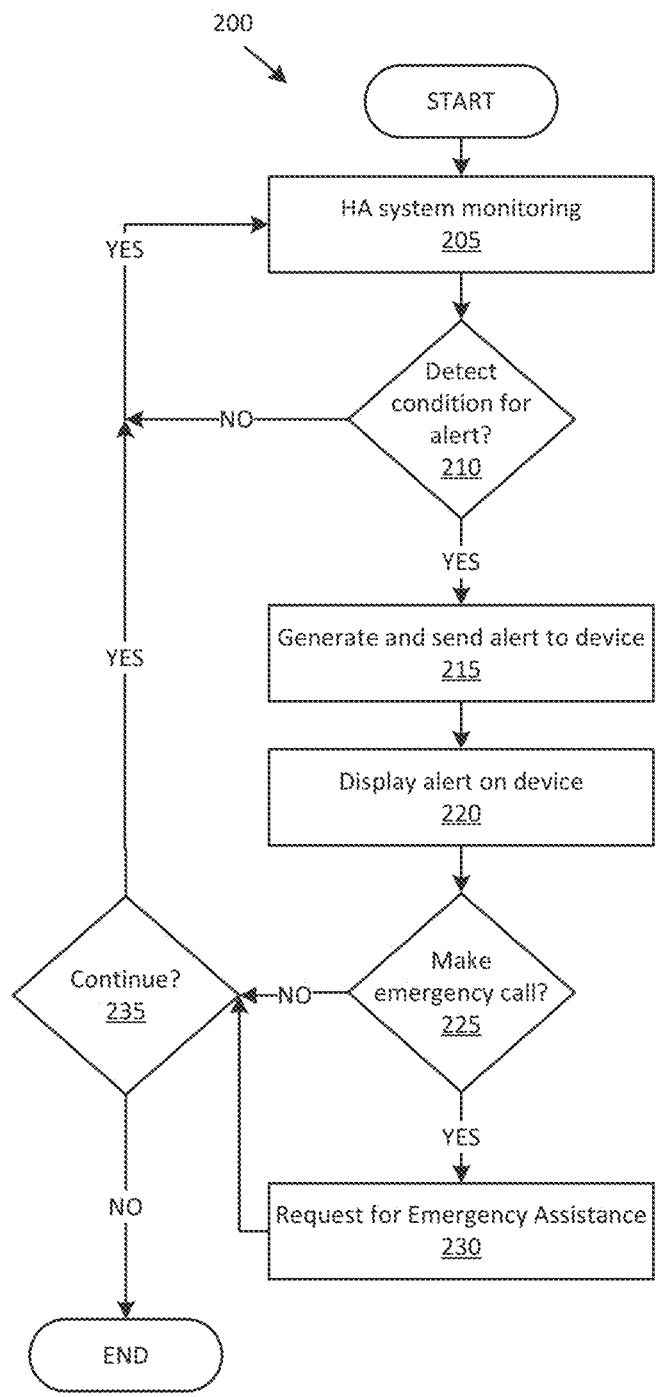
FIG. 2 is a diagram of an exemplary process for initiating an emergency call via a home automation system.

FIG. 2 is a diagram of an exemplary process for initiating an emergency call via a home automation system. The process 200 begins in a block 205, in which the controller 120 in a customer premises 105 performs home automation monitoring in a conventional manner, e.g., as described above. For example, as described above, data collectors 125 may provide data to the controller 120, which may then evaluate such data according to predetermined parameters to determine whether a potential alert or emergency condition exists.

Next, in a block 210, the controller 205 determines whether an alert condition exists, e.g., a data value from a collector 125 is above or below a predetermined threshold, e.g., for temperature, noise, presence of carbon monoxide, etc. If no alert condition exists, the process 200 returns to the block 205. If an alert condition exists, then a block 215 is executed next.

In the block 215, the controller 120 generates an alert message, e.g., a VoIP call, to be sent to one or more devices 130. Alternatively, the controller 120 could send a message to the home automation server 135, which in turn could communicate with the one or more devices 130. In any case, for example, a memory of the controller 120 may store information identifying a device 130 and mechanisms for sending a message to the device 130, e.g., a cellular telephone number or other identifying information for a device. Further, the controller 120 may provide a message, e.g., in one or more conventional data packets, providing information relating to the alert, e.g., information such as shown in the GUI 600 identifying an address of the customer premises 105, describing an alert or emergency condition, and possibly providing data from a data collector 125 either by default or in response to user input as discussed above with respect to the GUI 600. As also discussed above with respect to the GUI 600, exemplary content of a message from the controller 120 to a device 130 could include images, sound, data values such as temperatures, humidities, etc. Accordingly, the message provided in the block 215 could include an alert code or the like, e.g., a numeric value associated with an emergency or potential emergency condition, as well as data values such as those just mentioned, and also as well as media content such as audio data, image data, etc.

Next, in a block 220, the device 130 displays information from the alert or message provided by the controller 120. For example, the GUI 600 as shown in FIG. 6 illustrates one exemplary display of information by a device 130 based on an alert or message provided by the controller 120. As discussed above, the display on the device 130 may include information relating to an alert incident and/or possible emergency, along with an option for a user to initiate an emergency call such as a 911 call.

Next, in a block 225, the device 130 determines whether input has been received to make an emergency call. If so, the process 200 proceeds to the block 230. Otherwise, the process 200 proceeds to a block 235.

In the block 230, the device 130 initiates an emergency call. Details of exemplary processes by which an emergency call may be initiated and conducted our discussed below with respect to FIGS. 3-5. In general, the device 130 initiates a request for emergency assistance, e.g., an emergency telephone call, based not on a location of the device 130, but based on a location of the customer premises 105 from which a controller 120 alert or message was received. As further described below, after a call is initiated, the device 130 may receive further information from the controller 120 and/or an emergency response provider from whom emergency assistance has been requested.

In the block 235, which may follow either of the blocks 225, 230, the device 130 determines whether the process 200 should continue. For example, a device 130 could be powered off, a user could terminate an application configured to perform operations described herein, a user could select an option to no longer receive communications from one or more controllers 120, etc. If the process 200 should continue, then control returns to the block 205. Otherwise, the process 200 ends.

Figure 3:
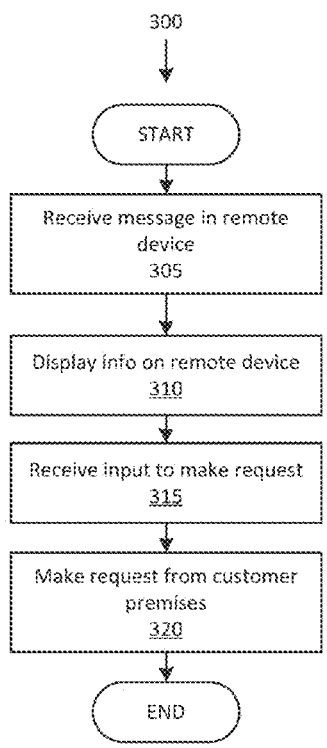
FIG. 3 is a diagram of an exemplary process for making an emergency call from a customer premises.

FIG. 3 is a diagram of an exemplary process 300 for making an emergency request from a customer premises. For example, a user selection on a device 130 remote from the customer premises 105 could request that an emergency request be made from the customer premises 105, e.g., initiated by a controller 120 in the customer premises 105.

Accordingly, the process 300 begins with a block 305, in which the message or alerts regarding an incident, emergency condition, etc., in a customer premises 105 is received in a remote device 130, e.g., in a manner described above with respect to the process 200.

Next, in a block 310, the remote device 130 provides a display based on information received from a controller 120 in the customer premises 105, e.g., again, in a manner described above with respect to the process 200.

Next, in a block 315, the remote device 130 receives input, e.g., via a user selection of an option provided by a field 630 in a GUI 600 displayed on the remote device 130 as shown in FIG. 6, to make a request for emergency assistance, e.g., to make a 911 call. Upon receiving such input, the device 130 sends the request to the controller 120 in the customer premises 105 that provided the message received as described above with respect to the block 305.

Next, in a block 320, the controller 120 receives, from the device 130, the instruction to make a request for emergency assistance. In response, the controller 120 may place a VoIP call to a PSAP, or may send an instruction, e.g., via a network internal to the customer premises 105, to a device within the customer premises 105 to make the call. In one implementation, the controller 120 or other device in the customer premises 105 places the emergency call by using functionality of a home automation system to make an emergency call, e.g., as the controller 120 may be configured to do. Alternatively, the device 130 could place a VoIP call to the controller 120, which could then forward the call to a PSAP 145 or the like. The controller 120 could provide the PSAP 145 with location information for the customer premises 105 in forwarding the call, whereby a user of the device 130 could be in voice communication with an operator at emergency call service provider 140, the emergency call service provider 140 having been provided with location information of the customer premises 105 and not the remote device 130.

Following the block 320, the process 300 ends. However, it should be noted that, once a request for emergency services is initiated from the customer premises 105, and once an emergency call is connected, the remote device 130 could be configured to continue to receive information from the controller 120, and the controller 120 could be configured to provide such information. Thus, referring back to FIG. 2, in the block 235 it may be determined that the process 200 should continue if such further monitoring and communication is to occur. Further, the controller 120 could be configured to provide information, e.g., from data collectors 125, until an emergency call is complete, for predetermined period of time after an emergency call has been completed, or until a user of the device 130 powers off the device 130 or provides input to stop communications from the controller 120. Yet further alternatively or additionally, the remote device 130 could communicate with the controller 120 by VoIP or the like, and the controller 120 could forward an E-911 call on behalf of the remote device 130.

Figure 4:
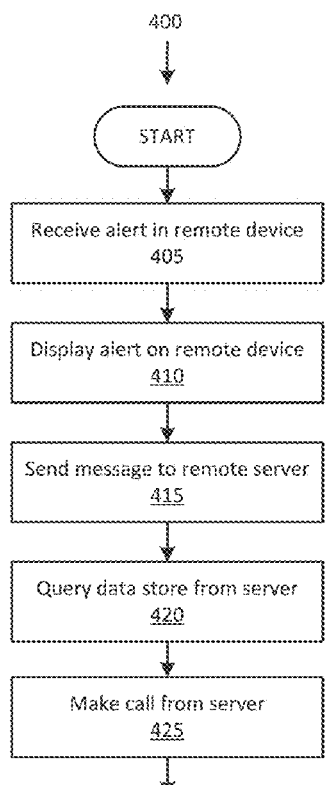
FIG. 4 is a diagram of an exemplary process for making an emergency call from a server remote from a customer premises to a public safety answering point (PSAP).

FIG. 4 is a diagram of an exemplary process 400 for making an emergency call from a server remote 135 from a customer premises 105 to a public safety answering point (PSAP) 145. The process 400 begins in a block 405, executed in a manner similar to the block 305, discussed above. The block 405 is followed by a block 410, executed in a manner similar to the block 310, discussed above.

Following the block 410, in a block 415, the remote device 130 sends a message to the remote home automation server 135. For example, the device 130 may place a VoIP call to the server 135, including, e.g., in one or more fields of a SIP INVITE message, identifying information for the customer premises 105 received from the controller 120 as described above.

Next, in a block 420, the server 135 queries the data store 135, e.g., with the unique or substantially unique identifier for the customer premises 105, to obtain location information, e.g., geo-coordinates and/or a street address, for the customer premises 105.

Next, in a block 425, once location information for the customer premises 105 has been received, the server 135 communicates, e.g., places a VoIP call according to SIP, to a PSAP 145. Using the location information for the customer premises 105, the PSAP 145 is then able to forward the communication, e.g., the VoIP call, to an appropriate emergency call service provider 140 for the location of the customer premises 105. For example, the PSAP 145 generally includes a look-up table or the like associating customer premises 105 locations with emergency call service providers 140.

Following the block 425, the process 400 ends. However, as was described following the process 300, it should be noted that once an emergency services call is initiated, the remote device 130 could continue to receive information from the controller 120.

It should further be noted that the process 400 provides certain advantages not realized from the process 300. For example, the process 400 allows emergency calling operations to be hosted on the server 135, therefore saving the costs and difficulties of establishing such operations in the customer premises 105, e.g., including emergency calling functionality in the controller 120. Further, depending on an emergency situation in a customer premises 105, a device 120 or the like may lose power or suffer damage preventing it from completing an emergency call that may then be completed by the home automation server 135.

Figure 5:
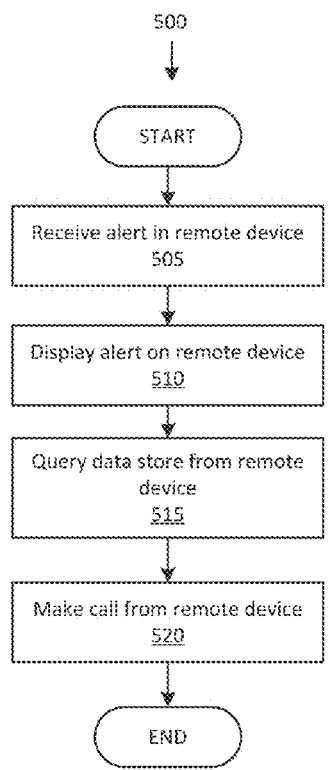
FIG. 5 is a diagram of an exemplary process for making an emergency call from a user device remote from a customer premises to a public safety answering point (PSAP).

FIG. 5 is a diagram of an exemplary process 500 for making an emergency call from a user device 130 physically remote from a customer premises 105 to a public safety answering point (PSAP) 145. The process 500 begins in a block 505, executed in a manner similar to the blocks 305, 405, discussed above. The block 505 is followed by a block 510, executed in a manner similar to the blocks 310, 410, discussed above.

Following the block 510, in a block 515, the remote device 130 queries the data store 135, e.g., with the unique are substantially unique identifier for the customer premises 105, to obtain location information, e.g., geo-coordinates and/or a street address, for the customer premises 105.

Next, in a block 520, once location information for the customer premises 105 has been received, the remote device 130 communicates, e.g., places a VoIP call according to SIP, to a PSAP 145. Using the location information for the customer premises 105, the PSAP 145 is then able to forward the communication, e.g., the VoIP call, to an appropriate emergency call service provider 140 for the location of the customer premises 105. For example, as mentioned above, the PSAP 145 generally includes a look-up table or the like associating customer premises 105 locations with emergency call service providers 140.

Following the block 520, the process 400 ends. However, as was described following the processes, 300, 400, it should be noted that once an emergency services call is initiated, the remote device 130 could continue to receive information from the controller 120. Further, as with the process 400, the process 500 presents certain advantages not available from the process 300. For example, the process 500 allows emergency calling operations to be provided by the remote device 130, therefore saving the costs and difficulties of establishing such operations in the customer premises 105, e.g., including emergency calling functionality in the controller 120. Further, depending on an emergency situation in a customer premises 105, a device 120 or the like may lose power or suffer damage preventing it from completing an emergency call that may then be completed by the remote device 130.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical, flash, or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system, comprising a mobile computing device that includes a processor and a memory, the mobile device being at a first geographic location different from a second geographic location of a customer premises, the mobile device being configured to:
   receive from the customer premises information including data indicating a status of the customer premises and an identifier for the customer premises;
   receive user input to place an emergency call concerning the customer premises;
   provide the identifier for the customer premises to a data store as part of a query for a location of the customer premises;
   receive a response to the query including the second location;
   send a request for a public safety answering point (PSAP) to request emergency services at the second location; and
   receive further data concerning a status of the customer premises after sending the request for a PSAP to request emergency services at the second location.

2. The system of claim 1, the mobile device being further configured to display information based on the message prior to receiving user input to place an emergency call concerning the customer premises.

3. The system of claim 1, further comprising a second computing device that includes a processor and a memory, the second computing device being at a third geographic location different from each of the first geographic location and the second geographic location, the second computing device configured to:
   receive the request for the PSAP to request emergency services at the second location;
   and forward at the request to the PSAP.

4. The system of claim 1, wherein at least one of the information from the customer premises, the query to the data store, and the request for the PSAP are provided according to Voice over Internet Protocol (VoIP).

5. The system of claim 1, the data indicating a status of the customer premises including at least one of audio data, image data, a data value related to a condition in the customer premises, and an alert code.

6. The system of claim 1, the mobile device being further configured to display at least some of the data indicating a status of the customer premises.

7. A system, comprising a first computing device that includes a processor and a memory, the first computing device being at a first geographic location different from a second geographic location of a customer premises, the first computing device being configured to:
   receive information relating to the customer premises including data indicating a status of the customer premises and an identifier for the customer premises;
   provide the identifier for the customer premises to a data store as part of a query for a location of the customer premises;
   receive a response to the query including the second location;
   send a request for a public safety answering point (PSAP) to request emergency services at the second location; and
   receive further data concerning a status of the customer premises after sending the request for a PSAP to request emergency services at the second location.

8. The system of claim 7, further comprising a mobile computing device that includes a processor and a memory, the mobile computing device being at a third geographic location different from each of the first geographic location and the second geographic location, the second computing device being configured to:
   receive from the customer premises the information relating to the customer premises;
   receive user input to place an emergency call concerning the customer premises; and
   send a message to the first computing device, the message including the information relating to the customer premises, to request a PSAP to request emergency services at the second location.

9. The system of claim 8, the mobile device being further configured to display at least some of the data indicating a status of the customer premises.

10. The system of claim 8, further comprising a second mobile computing device that includes a processor and a memory, the second mobile computing device being at a fourth geographic location different from each of the first geographic location, the second geographic location, and the third geographic location, the second mobile computing device being configured to:
    receive from the customer premises the information relating to the customer premises;
    receive user input to place an emergency call concerning the customer premises; and
    send a message to the first computing device, the message including the information relating to the customer premises, to request a PSAP to request emergency services at the second location.

11. The system of claim 7, wherein at least one of the information relating to the customer premises, the query to the data store, and the request for the PSAP are provided according to Voice over Internet Protocol (VoIP).

12. The system of claim 7, the data indicating a status of the customer premises including at least one of audio data, image data, a data value related to a condition in the customer premises, and an alert code.

13. A method, comprising:
receiving, at a first geographic location remote from a second geographic location of a customer premises, information relating to the customer premises, including data indicating a status of the customer premises and an identifier for the customer premises;
providing the identifier for the customer premises to a data store as part of a query for a location of the customer premises;
receiving a response to the query including the second location;
sending a request for a public safety answering point (PSAP) to request emergency services at the second location; and
receiving, at the third geographic location, further data concerning a status of the customer premises after sending the request for a PSAP to request emergency services at the second location.

14. The method of claim 13, comprising:
receiving from the customer premises, at a third geographic location different from each of the first geographic location and the second geographic location, the information relating to the customer premises;
receiving, at the third geographic location, user input to place an emergency call concerning the customer premises; and
sending, from the third geographic location, a message to the first geographic location, the message including the information relating to the customer premises, to request a PSAP to request emergency services at the second location.

15. The method of claim 14, further comprising displaying, at the third geographic location, at least some of the data indicating a status of the customer premises.

16. The method of claim 13, wherein at least one of the information relating to the customer premises, the query to the data store, and the request for the PSAP are provided according to Voice over Internet Protocol (VoIP).

17. The method of claim 13, the data indicating a status of the customer premises including at least one of audio data, image data, a data value related to a condition in the customer premises, and an alert code.

\* \* \* \* \*